(12) United States Patent
Han et al.

(10) Patent No.: US 12,372,153 B2
(45) Date of Patent: Jul. 29, 2025

(54) SELF-LOCKING MECHANISM FOR GEARING ARRANGEMENT, GEARING ARRANGEMENT, ACTUATOR, AND LIFTING PLATFORM

(71) Applicant: ZHEJIANG JIECANG LINEAR MOTION TECHNOLOGY CO., LTD., Zhejiang (CN)

(72) Inventors: Yinan Han, Shaoxing (CN); Yajun Zhang, Shaoxing (CN); Zhijie Xiao, Shaoxing (CN); Miaojiang Ding, Shaoxing (CN)

(73) Assignee: ZHEJIANG JIECANG LINEAR MOTION TECHNOLOGY CO., LTD., Shaoxing (CN)

( * ) Notice: Subject to any disclaimer, the term of this patent is extended or adjusted under 35 U.S.C. 154(b) by 0 days.

(21) Appl. No.: 18/286,861

(22) PCT Filed: Jul. 28, 2022

(86) PCT No.: PCT/CN2022/108571
§ 371 (c)(1),
(2) Date: Oct. 13, 2023

(87) PCT Pub. No.: WO2023/006023
PCT Pub. Date: Feb. 2, 2023

(65) Prior Publication Data
US 2024/0191795 A1 Jun. 13, 2024

(30) Foreign Application Priority Data

Jul. 30, 2021 (CN) .......................... 202121773482.6
Jul. 14, 2022 (CN) .......................... 202221820657.9

(51) Int. Cl.
*F16H 63/36* (2006.01)
*F16H 1/20* (2006.01)
(Continued)

(52) U.S. Cl.
CPC ............. *F16H 63/36* (2013.01); *F16H 1/206* (2013.01); *F16H 57/039* (2013.01);
(Continued)

(58) Field of Classification Search
CPC ........ F16H 63/36; F16H 1/206; F16H 57/039; F16H 2035/006; F16H 2061/2892; A47B 2009/046
See application file for complete search history.

(56) References Cited

U.S. PATENT DOCUMENTS 4,246,991 A   1/1981  Oldakowski
8,448,825 B2*  5/2013  Mitrovic ............. B05C 17/0103
                                                     222/386

(Continued)

FOREIGN PATENT DOCUMENTS

CN   202140527 U   2/2012
CN   106966345 A   7/2017
(Continued)

OTHER PUBLICATIONS

Oct. 9, 2022 International Search Report issued in International Patent Application No. PCT/CN2022/108571.
(Continued)

*Primary Examiner* — Gregory Robert Weber
(74) *Attorney, Agent, or Firm* — Oliff PLC

(57) ABSTRACT

A self-locking mechanism for a gearing arrangement, a gearing arrangement, an actuator, and a lifting platform, which relate to the technical field of lifting tables. The
(Continued)

self-locking mechanism includes a casing, a self-locking gear, and a brake member, the self-locking gear meshing with the gearing arrangement, the brake member being connected between the casing and the self-locking gear; in a case where the gearing arrangement pushes the self-locking gear forwardly, the brake member releases the self-locking gear, and in a case where the gearing arrangement pushes the self-locking gear reversely, the brake member brakes the self-locking gear.

11 Claims, 10 Drawing Sheets

(51) Int. Cl.
*F16H 57/039* (2012.01)
*A47B 9/04* (2006.01)
*F16H 35/00* (2006.01)
*F16H 61/28* (2006.01)

(52) U.S. Cl.
CPC .. *A47B 2009/046* (2013.01); *F16H 2035/006* (2013.01); *F16H 2061/2892* (2013.01)

(56) References Cited

U.S. PATENT DOCUMENTS

| | | | |
|---|---|---|---|
| 10,001,182 B2* | 6/2018 | Zhang | F16D 65/16 |
| 11,022,203 B2 | 6/2021 | Palvoelgyi et al. | |
| 11,098,779 B2* | 8/2021 | Hur | F16D 13/10 |
| 2016/0223040 A1 | 8/2016 | Watzek et al. | |
| 2020/0291681 A1* | 9/2020 | Markanday | B60R 25/02156 |
| 2020/0391784 A1* | 12/2020 | Saito | B62D 5/001 |

FOREIGN PATENT DOCUMENTS

| | | |
|---|---|---|
| CN | 208348423 U | 1/2019 |
| CN | 111003672 A | 4/2020 |
| CN | 213585435 U | 6/2021 |
| CN | 113757312 A | 12/2021 |
| CN | 215806051 U | 2/2022 |

OTHER PUBLICATIONS

Oct. 9, 2022 Written Opinion issued in International Patent Application No. PCT/CN2022/108571.
Feb. 11, 2025 Extended European Search Report issued in European Patent Application No. 22848628.8.

\* cited by examiner

A-A

SELF-LOCKING MECHANISM FOR GEARING ARRANGEMENT, GEARING ARRANGEMENT, ACTUATOR, AND LIFTING PLATFORM

FIELD

The subject matter described herein relates to the technical field of lifting tables, and more particularly relates to a self-locking mechanism for a gearing arrangement, a gearing arrangement, an actuator, and a lifting column.

BACKGROUND

The currently available gearing arrangements are generally provided with a locking structure on a transmission gear to enable self-locking of the transmission gear; during the self-locking process, the transmission gear is heated up under the action of the locking structure, which shortens a service life of the transmission gear; in addition, existing gearing arrangements have an invariable self-locking force, which cannot satisfy versatile self-locking demands.

SUMMARY

To at least overcome the above and other drawbacks in conventional technologies, embodiments of the disclosure provide a self-locking mechanism for a gearing arrangement.

Embodiments of the disclosure adopt a technical solution below:

A self-locking mechanism for a gearing arrangement, comprising: a casing, a self-locking gear, and a brake member, the self-locking gear meshing with the gearing arrangement, the brake member being connected between the casing and the self-locking gear, wherein in a case where the gearing arrangement pushes the self-locking gear forwardly, the brake member releases the self-locking gear, and in a case where the gearing arrangement pushes the self-locking gear reversely, the brake member brakes the self-locking gear.

In the technical solution above, the gearing arrangement in a transmission chain is self-locked via the self-locking gear not in the transmission chain, preventing direct friction between the brake member and the gearing arrangement and thus preventing heating-up of the gearing arrangement, whereby the service life of the gearing arrangement is extended; by changing the gear ratio between the gearing arrangement and the self-locking gear, the speed ratio therebetween may be changed, so that the self-locking mechanism can output variable magnitudes of self-locking forces to satisfy self-locking demands of products with different loads, which offers a more flexible structure and a wider array of applications.

In some implementations, the self-locking gear comprises a meshing part and a rotary part which is coaxially arranged with and secured to the meshing part, the brake member being connected to the rotary part. This structure enables the brake member to brake the self-locking gear via braking to the rotary part, preventing damages to the structure of the meshing part of the self-locking gear during the procedure of connecting the brake member.

In some implementations, the brake member refers to a torsion spring sleeved over the rotary part, the torsion spring elastically pressing against the rotary part, one end of the torsion spring being connected to the casing, wherein in a case where the self-locking gear is forwardly pushed, the torsion spring is radially expanded to bring the self-locking gear to rotate, and in a case where the self-locking gear is reversely pushed, the torsion spring clasps the rotary part to brake the self-locking gear.

In some implementations, the gearing arrangement includes an operating state and a self-locked state; wherein when the gearing arrangement is in the operating state, the gearing arrangement is driven to rotate to push the self-locking gear forwardly, whereby the torsion spring is radially expanded such that an inside diameter of the torsion spring is greater than an outer diameter of an end portion of the self-locking gear, further bringing the self-locking gear to rotate along with the gearing arrangement; and when external driving to the gearing arrangement is suspended while the gearing arrangement is subjected to an external force to rotate reversely, the gearing arrangement pushes the self-locking gear reversely, so that the torsion spring clasps the end portion of the self-locking gear to block the self-locking gear from rotating, whereby the gearing arrangement is braked.

In some implementations, the rotary part comprises a body portion integrally formed with the meshing part and a tubing sleeved over the body portion, the tubing being circumferentially secured with the body portion, the torsion spring being sleeved over the tubing. This structure may ease machining of the self-locking gear; only by replacing the tubing, the self-locking gear may be adapted to torsion springs of different sizes, whereby universality of the gear body is enhanced, such that the gearing arrangement has a more flexible structure and a wider array of applications. In addition, the body portion and the tubing are separately arranged, where the tubing may be made of a flexible material, e.g., plastics. The plastic tubing may not only reduce friction noise, but also may prevent residuals generated due to direct friction between the rigid (e.g., iron-based) torsion springs and idler gear. In addition, friction between the two iron-based materials will also cause jerks; in this case, the plastic tubing may play a good buffer role.

In some implementations, the rotary part is coaxially provided at each of two ends of the meshing part, respectively; and two brake members are provided, the two brake members being connected to the two rotary parts, respectively. This structure may provide a more uniform self-locking force subjected to the two ends of the self-locking gear and reduces the stresses on the torsion springs at both sides, thereby extending service life of the torsion springs.

In some implementations, a rotary shaft is provided in the casing, the self-locking gear being sleeved outside the rotary shaft and in rotational connection to the rotary shaft. This simple structure facilitates assembly and disassembly.

A gearing arrangement comprises a housing and gearing disposed in the housing, wherein the gearing arrangement further comprises the self-locking mechanism as described supra, the self-locking gear being in transmission connection to the gearing. Such a structure can achieve the self-locking function of the gearing arrangement by means of the self-locking mechanism.

In some implementations, the gearing comprises an input gear and an output gear, the self-locking gear meshing with the output gear or the input gear.

In some implementations, the gearing comprises an input gear, an output gear, and a transfer gear, the transfer gear being in transmission connection to the output gear or the input gear, the self-locking gear meshing with the transfer gear.

In the technical solution above, during the designing and manufacturing phases of the gearing arrangement, without changing the speed ratio and gearing efficiency of the overall gearing, the speed ratio between the transfer gear and the self-locking gear may be flexibly selected and designed so as to adjust the self-locking force flexibly, thereby satisfying self-locking demands of products with different loads, whereby the gearing arrangement has a more flexible structure and a wider array of applications.

In some implementations, the transfer gear and the output gear are co-axially disposed and interlocked; or, the transfer gear meshes with the output gear; or, the transfer gear and the input gear are coaxially disposed and interlocked; or, the transfer gear meshes with the input gear.

The transfer gear and the output gear are coaxially provided, whereby the size of the gearing arrangement may be shrunk in the radial direction of the output gear. In addition, the transfer gear does not mesh with the output gear, so that the modulus and tooth profile of the transfer gear may be different from those of the output gear. Respective modulus and tooth profile of the transfer gear and the self-locking gear may be separately designed dependent on the magnitude of self-locking force, independent of the gearing, offering a more flexibility in adjusting the structure and self-locking force of the gearing arrangement as well as a wider array of applications. Meshing between the transfer gear and the output gear may shrink the size of the gearing arrangement in the radial direction of the output gear, so that the gearing arrangement is more flattened. The gearing is a reduction mechanism configured to increase torque by speed reduction, the transfer gear being directly in transmission connection with the input gear so that the input gear is directly self-locked. The self-locking toque may be amplified when being transferred to the output gear via the gearing; as such, without changing the self-locking structure formed by the transfer gear, the self-locking gear, and the torsion spring, this configuration may increase the self-locking force of the self-locking structure with respect to the gearing arrangement, achieving a better self-locking effect.

In some implementations, the gearing comprises a worm, and a worm gear provided with an insertion opening, the housing being provided thereon with an input hole for the worm to pass through and an output hole corresponding to the insertion opening.

This structure facilitates connection of the worm gear and the worm to the driving mechanism and the driven mechanism; meanwhile, the worm gear-worm transmission structure can change the transmission direction and save transmission space. The insertion opening enables direct connection between the worm gear and an external structural element which needs power input. In a case where the gearing is formed by the worm and the worm gear, the teeth on the worm gear are relatively thin with a low strength, so that the teeth on the worm gear need to be adapted to the worm, which cannot be changed arbitrarily; coaxial fixation between the transfer gear and the worm gear may prevent the worm gear from meshing with the transfer gear, so that the self-locking force is be directly transferred to the worm gear, whereby the transfer gear causes no damages to the teeth on the worm gear.

An actuator comprises an electric motor, wherein the actuator comprises the gearing arrangement as described supra, an output end of the electric motor being in transmission connection to the gearing. The gearing arrangement as an intermediary transmission element may increase and transfer the torque outputted by the electric motor; in addition, the gearing arrangement is self-lockable, which enables self-locking of the actuator.

A lifting platform comprises a lifting column, wherein the lifting platform further comprises the actuator described supra, and the lifting column comprises a transmission assembly, the gearing being in transmission connection to the transmission assembly. The actuator may drive the gearing in the lifting column, whereby self-locking is enabled.

DETAILED DESCRIPTION

Figure 1:
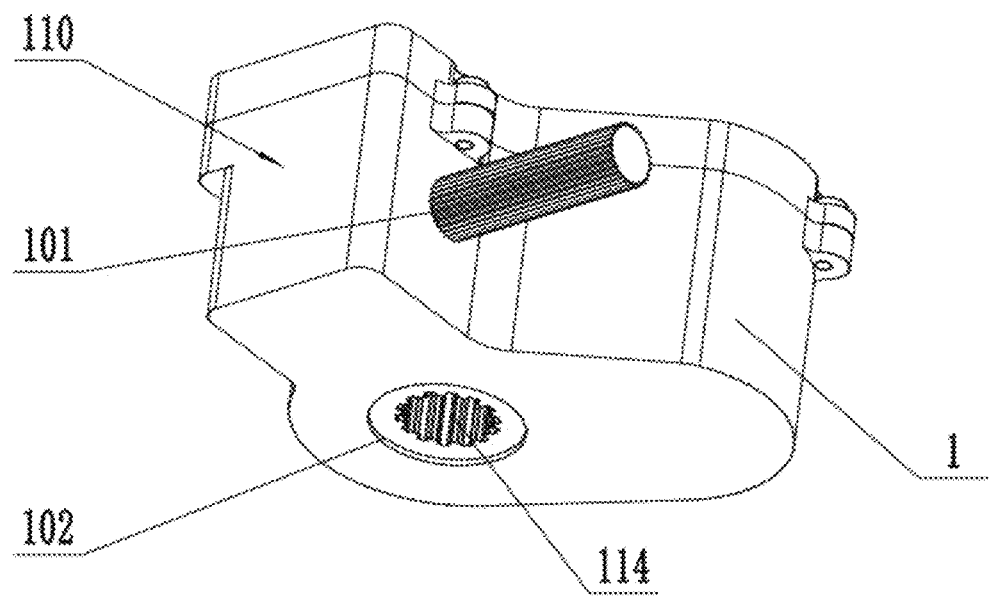
FIG. 1 is a stereoscopic diagram of a gearing arrangement in Example Embodiment 1.

Hereinafter, the disclosure will be described in further detail through example embodiments with reference to the accompanying drawings.

Example Embodiment 1

As illustrated in FIGS. 1 to 5, a self-locking mechanism for a gearing arrangement comprises: a casing 1, a self-locking gear 3, and a breaking element 2, the self-locking gear 3 meshing with the gearing arrangement 110, the breaking element 2 being connected between the casing 1 and the self-locking gear 3, so that in a case where the gearing arrangement 110 pushes the self-locking gear 3 forwardly, the breaking element 2 releases the self-locking gear 3, and in a case where the gearing arrangement 110 pushes the self-locking gear 3 reversely, the breaking element 2 brakes the self-locking gear 3.

In the technical solution above, the gearing arrangement 110 is self-locked via the self-locking mechanism 130, where the gearing arrangement 110 in a transmission chain is self-locked via the self-locking gear 3 not in the transmission chain, preventing direct friction between the brake member 2 and the gearing arrangement 110 and thus preventing heating-up of the gearing arrangement 110, whereby the service life of the gearing arrangement 110 is extended; by changing the gear ratio between the gearing arrangement 110 and the self-locking gear 3, the speed ratio therebetween may be changed, so that the self-locking mechanism 130 can output variable magnitudes of self-locking forces to satisfy self-locking demands of products with different loads, which offers a more flexible structure and a wider array of applications.

Figure 4:
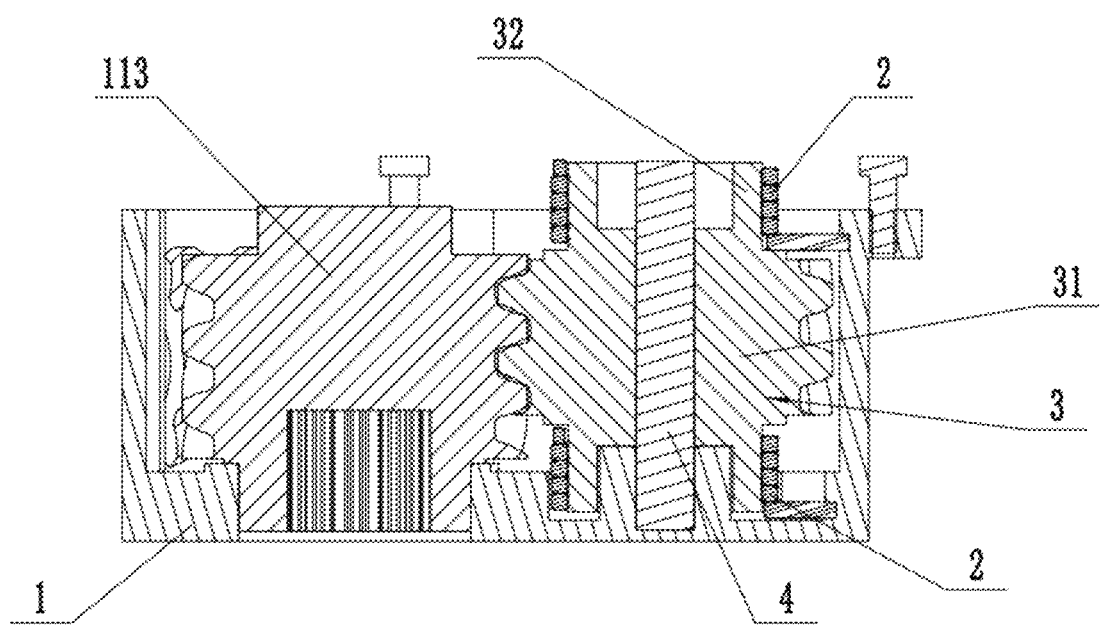
FIG. 4 is a sectional view A-A in FIG. 3.
Figure 5:
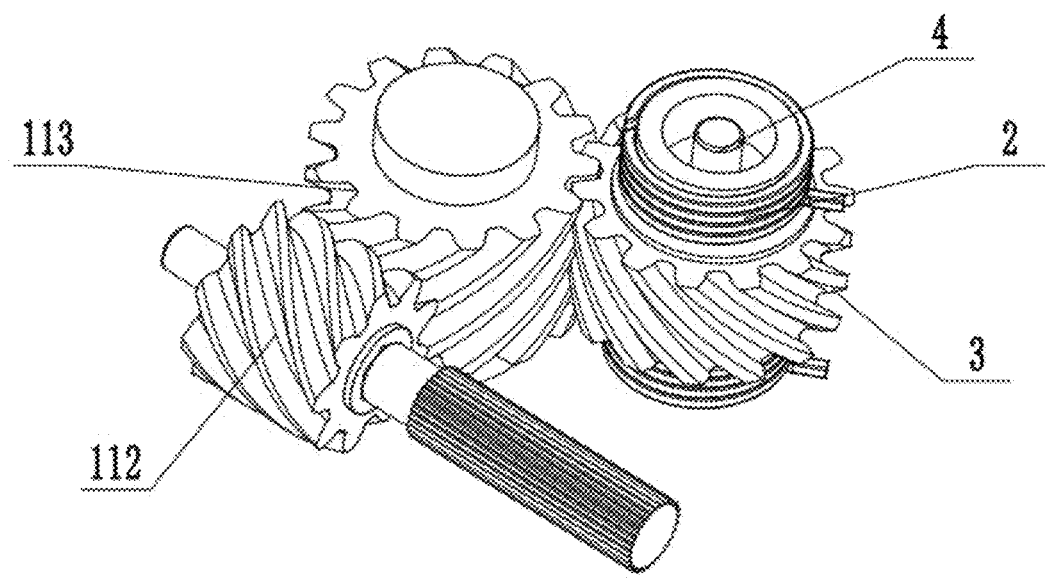
FIG. 5 is a meshing schematic diagram between an input gear, an output gear, and a self-locking gear in Example Embodiment 1.
Figure 6:
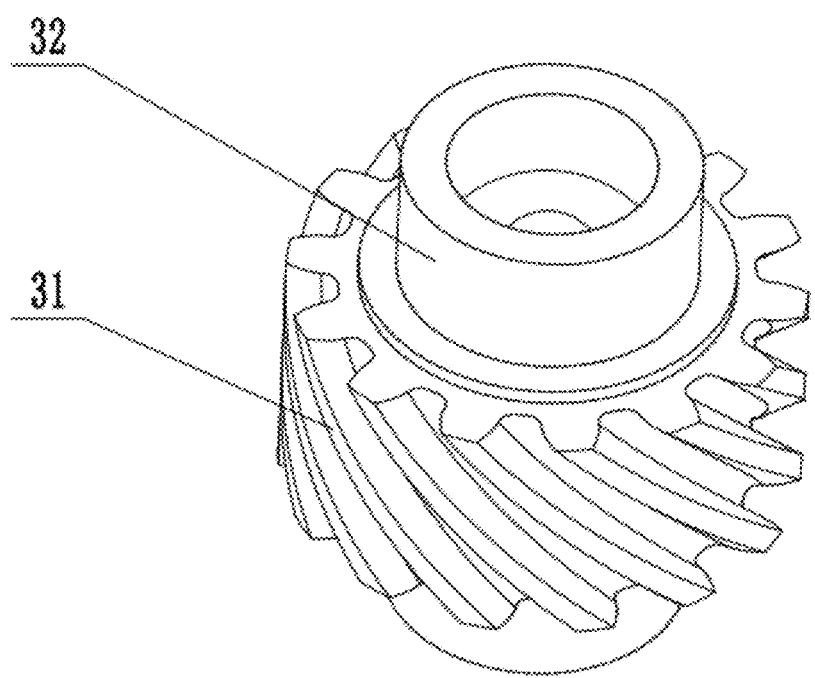
FIG. 6 is a stereoscopic diagram of the self-locking gear in Example Embodiment 1.

As illustrated in FIG. 4, the brake member 2 is a torsion spring; two torsion springs are provided; the self-locking gear 3 comprises a meshing part 31 and two rotary parts 32, the two rotary parts 32 being coaxially, fixedly arranged and secured at two ends of the meshing part 31, respectively, the two torsion springs being sleeved over the two rotary parts 32, respectively; the torsion springs press elastically tightly against the rotary part 32, one end of each of the torsion springs being connected to the casing 1; in a case where the self-locking gear 3 is forwardly pushed, the torsion springs are radially extended to allow the self-locking gear 3 to rotate, and in a case where the self-locking gear 3 is reversely pushed, the torsion springs clasp the rotary part 3 to brake the self-locking gear 3; the gearing arrangement 110 includes an operating state and a self-locked state, where when the gearing arrangement 110 is in the operating state, the gearing arrangement 110 is driven to rotate to push the self-locking gear 3 forwardly, and the torsion springs are extended radially such that the inside diameter of the torsion springs is greater than the outer diameter of the end portion of the self-locking gear 3, further causing the self-locking gear 3 to rotate along with the gearing arrangement 110; when external driving of the gearing arrangement 110 is suspended while the gearing arrangement 110 rotates reversely under an external force, the gearing arrangement 110 pushes the self-locking gear 3 reversely, so that the torsion springs clasp the end portion of the self-locking gear 3 to block the self-locking gear 3 from rotating, whereby the gearing arrangement 110 is braked.

Figure 9:
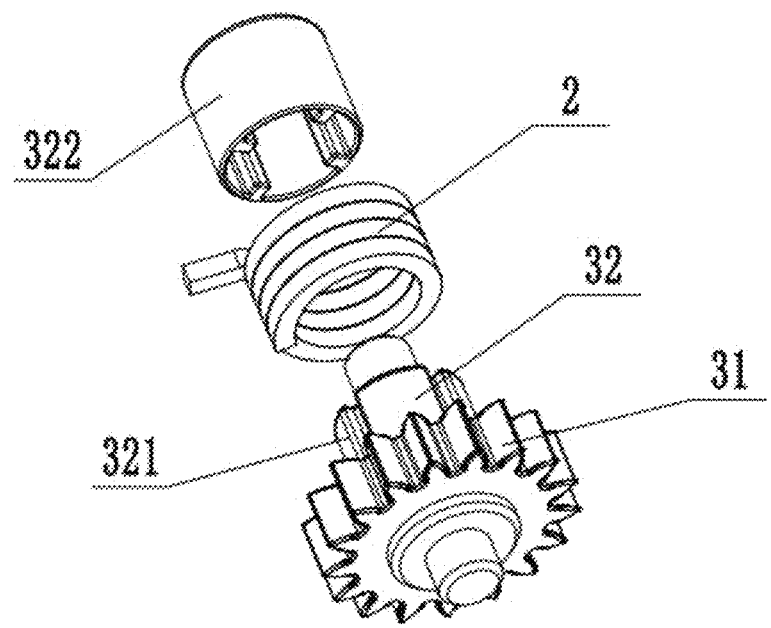
FIG. 9 is an exploded view of the self-locking gear in Example Embodiment 1.

In one implementation, as illustrated in FIG. 9, the rotary part 32 comprises a body portion 321 integrally formed with the meshing part 31 and a tubing 322 sleeved over the body portion 321, the tubing 322 being circumferentially fixed relative to the body portion 321, the torsion springs being sleeved over the tubing 322. A spline is provided on an inner sidewall of the tubing, a groove mated with the spline being provided at a position on the body portion where the body portion is sleeved with the tubing, the tubing and the body portion being circumferentially fixed via the spline and the groove, the torsion springs being sleeved over the tubing. This structure may ease machining of the self-locking gear 3; only by replacing the tubing 322, the self-locking gear 3 may be adapted to torsion springs of different sizes, whereby universality of the gear body is enhanced, such that the gearing arrangement has a more flexible structure and a wider array of applications. In addition, the body portion 321 and the tubing 322 are separately arranged, where the tubing 322 may be made of a flexible material, e.g., plastics. The plastic tubing 322 may not only reduce friction noise, but also may prevent residuals generated due to direct friction between the rigid (e.g., iron-based) torsion springs and idler gear. In addition, friction between the two iron-based materials will also cause jerks; in this case, the plastic tubing 322 may play a good buffer role.

In one implementation, as illustrated in FIG. 4, a rotary shaft 4 is provided in the casing 1, an end portion of the rotary shaft being inserted in the casing 1, the self-locking gear 3 is sleeved outside the rotary shaft 4 such that the self-locking gear 3 rotates about the rotary shaft 4. This simple structure facilitates assembly and disassembly.

Figure 8:
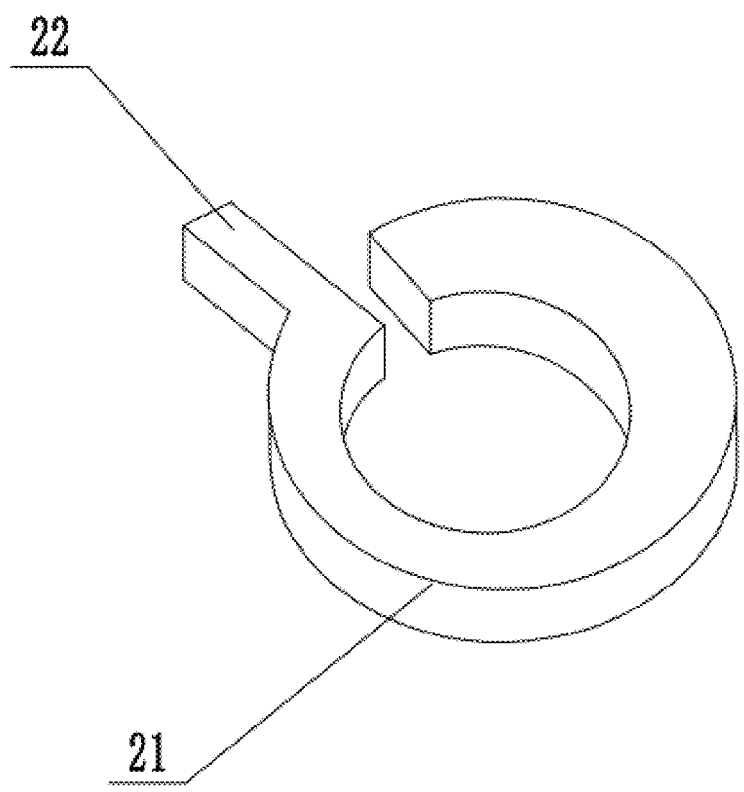
FIG. 8 is a schematic diagram of another torsion spring in Example Embodiment 1.

In one implementation, as illustrated in FIG. 8, the torsion spring is a planar torsion spring, comprising a body 2.1 for clasping the self-locking gear 3 and an arm 2.2 connected to an end portion of the body. A gap is formed between two ends of the body so that the body has a major arc shape; as the body clasps or releases the self-locking gear 3, the gap between the two ends of the body is varied; the torsion spring is secured on the casing 1 via the arm.

Figure 7:
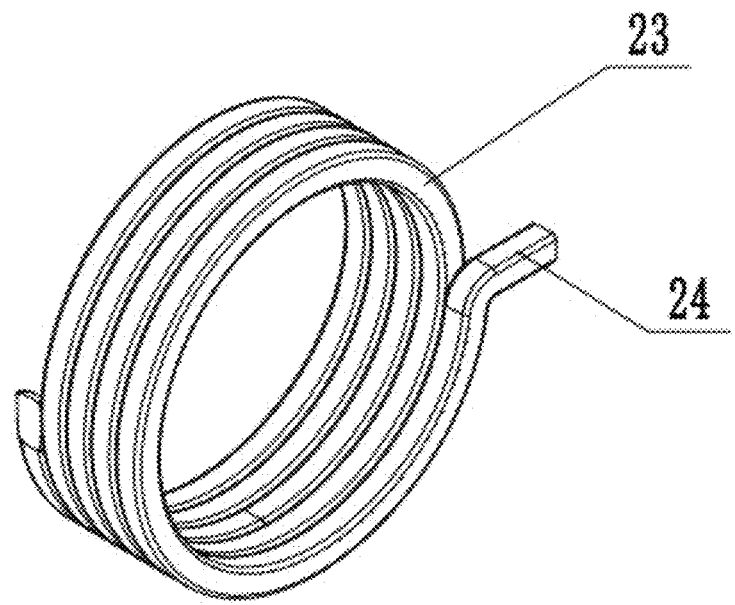
FIG. 7 is a schematic diagram of a torsion spring in Example Embodiment 1.

In another implementation, as illustrated in FIG. 7, the torsion spring 2 comprises a helical body 2.3 and an arm 2.4.

The brake member 2 may also be an elastic friction ring or an elastic ring pressing tightly against the self-locking gear via its own elasticity, which may also be a part limiting rotation of the self-locking gear to create frictional damping; the brake member 2 may also comprises a friction ring and a damping member which increases the frictional damping between the friction ring and the self-locking gear. A specific structure of the brake member 2 may refer to patent literatures CN202121418470.1, CN202121066053.5, CN202121533537.6, CN202121540653.0, and CN202121532519.6.

Example Embodiment 2

Figure 2:
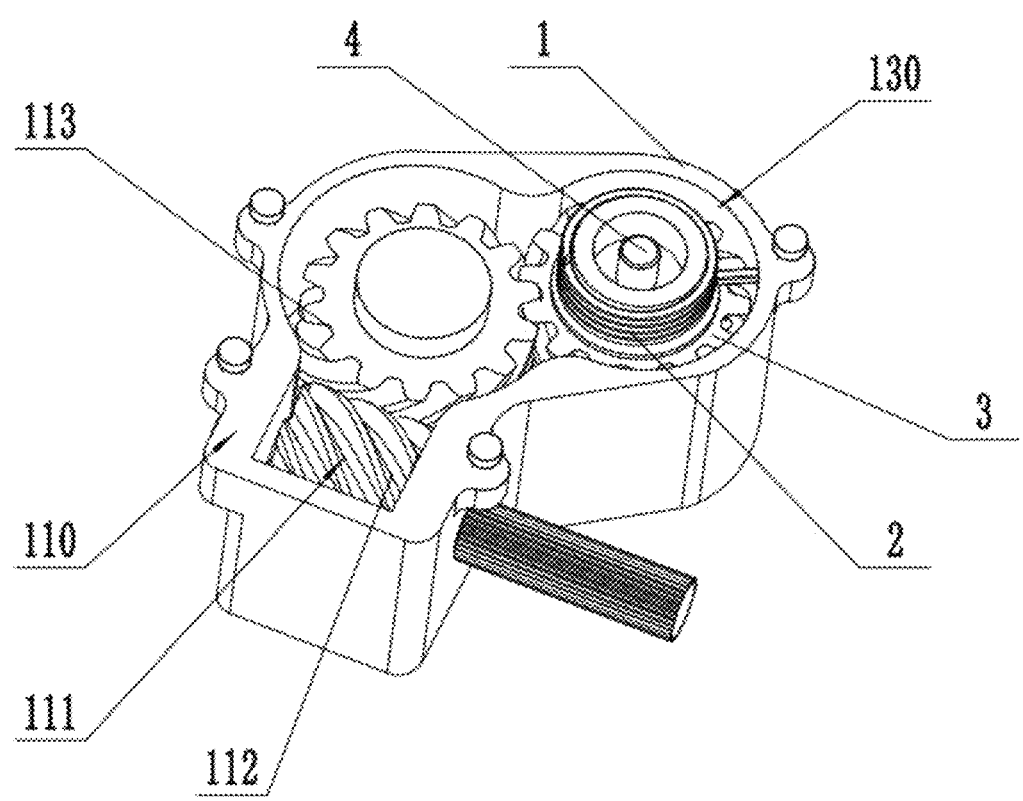
FIG. 2 is an internal schematic view of the gearing arrangement in Example Embodiment 1.
Figure 3:
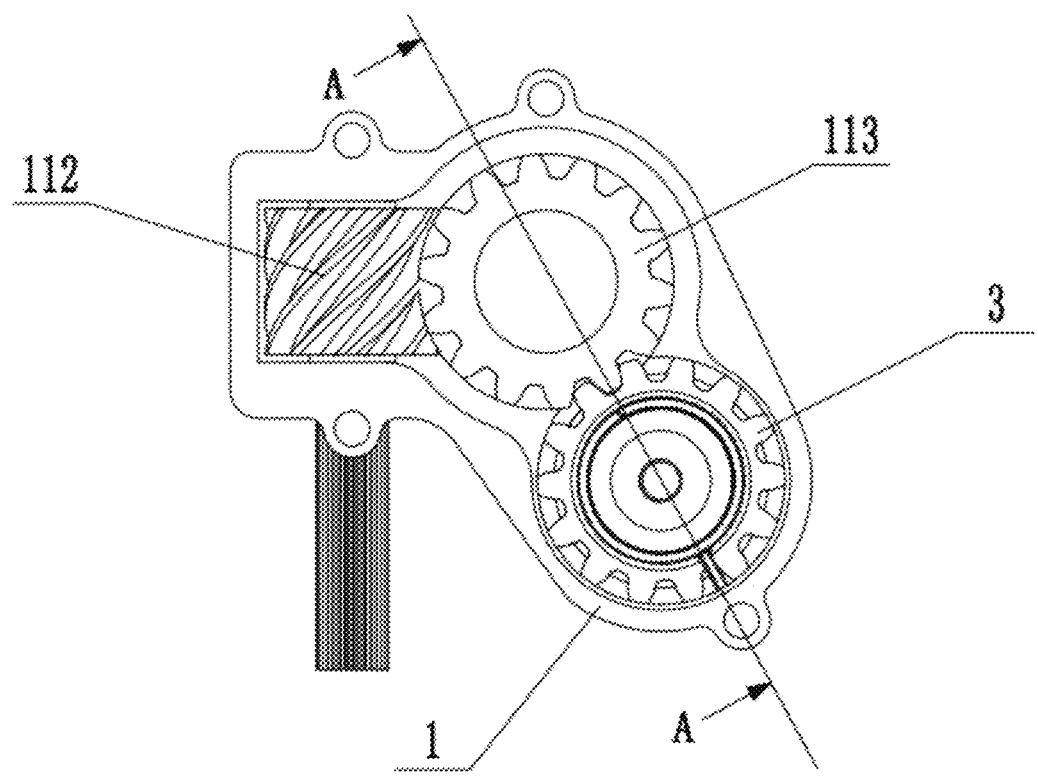
FIG. 3 is a top view of the gearing arrangement in Example Embodiment 1.

As illustrated in FIG. 2, a gearing arrangement comprises a housing and gearing 111 disposed in the housing, the gearing arrangement 110 comprising the self-locking mechanism 130 described in Example Embodiment 1, the gearing 111 comprising an input gear 112 and an output gear 113, the self-locking gear 3 meshing with the output gear 113 or the input gear 112. This structure may realize self-locking of the gearing arrangement 110 via the self-locking mechanism 130.

Example Embodiment 3

Figure 10:
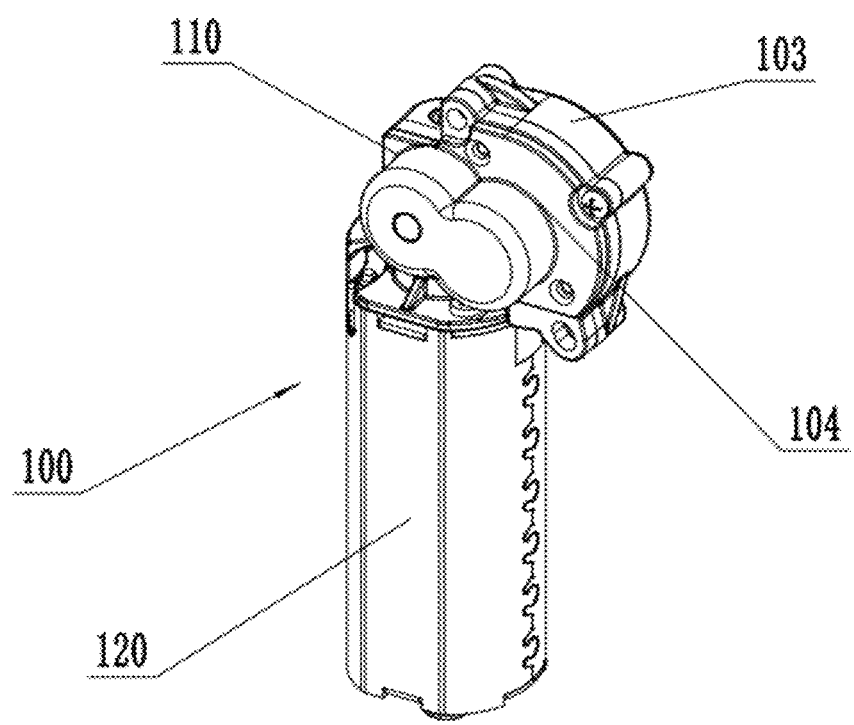
FIG. 10 is a structural schematic diagram of Example Embodiment 3.
Figure 11:
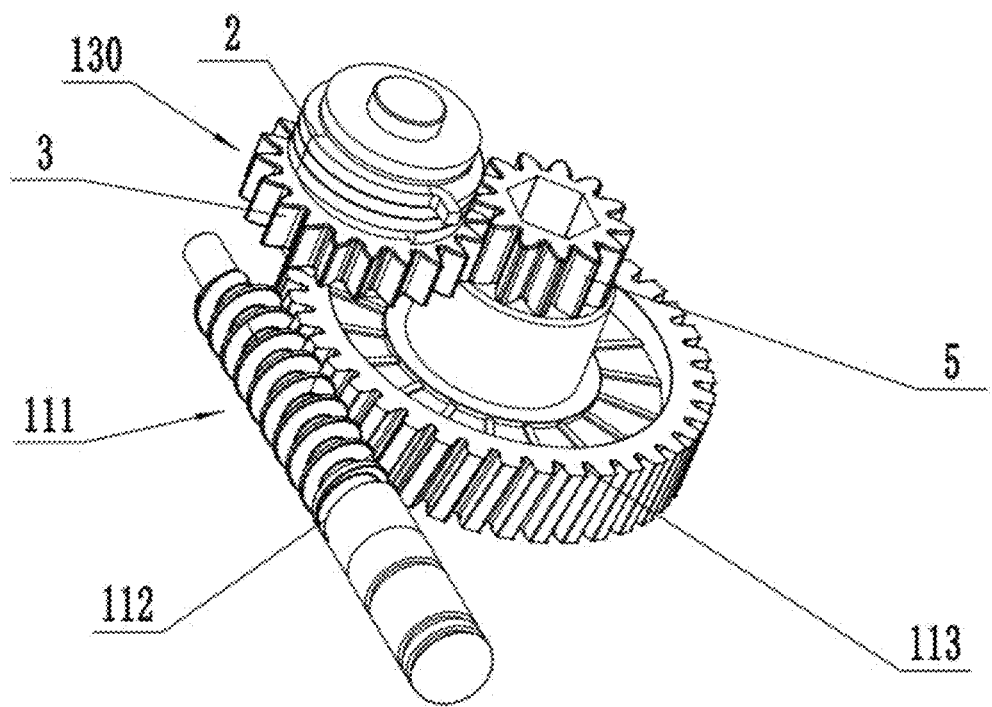
FIG. 11 is a first local structural schematic diagram of Example Embodiment 3.
Figure 12:
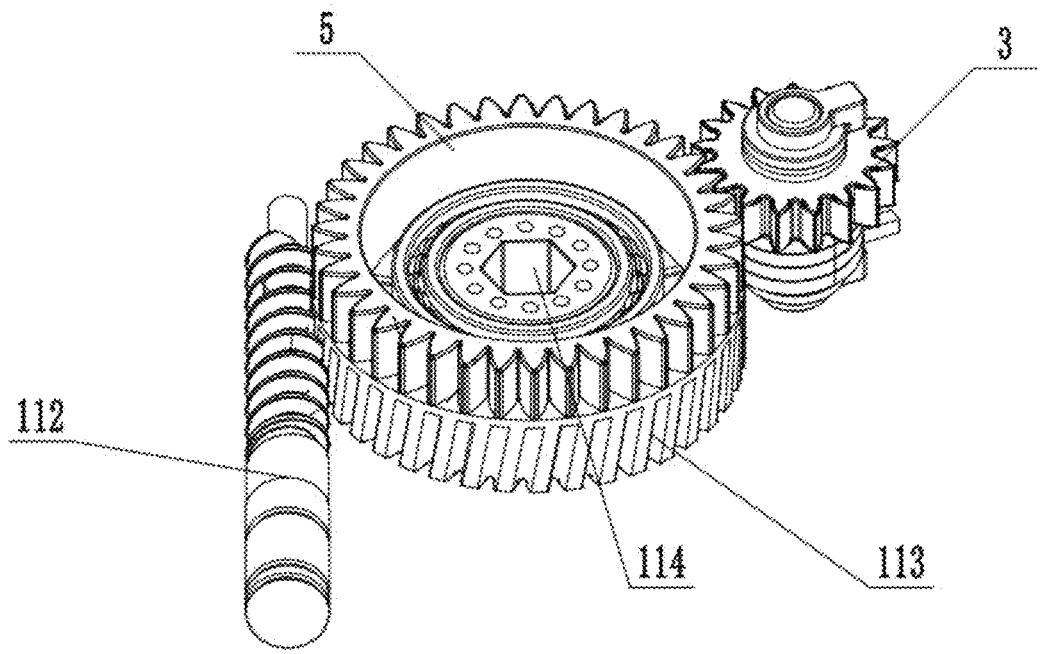
FIG. 12 is a second local structural schematic diagram of Example Embodiment 3.

As illustrated in FIGS. 10 to 12, a gearing arrangement comprises a housing and gearing 111 disposed in the housing, the gearing arrangement 110 comprising the self-locking mechanism 130 as described in Example Embodiment 1, the gearing 111 comprising an input gear 112, an output gear 113, and a transfer gear 5, the self-locking gear 3 meshing with the transfer gear 5. The casing 1 is integrally formed with the housing.

In the technical solution above, during the designing and manufacturing phases of the gearing arrangement 110, without changing the speed ratio and gearing efficiency of the overall gearing 111, the speed ratio between the transfer gear 5 and the self-locking gear may be flexibly selected and designed so as to adjust the self-locking force flexibly, thereby satisfying self-locking demands of products with different loads, such that the gearing arrangement 110 has a more flexible structure and a wider array of applications.

The transfer gear 5 and the self-locking gear 3 may be provided in plurality, the plurality of transfer gears 5 meshing in sequence, the plurality of self-locking gears 3 meshing in sequence, the transfer gear 5 located at one end being in transmission connection to one of the self-locking gears 3 thereof, the transfer gear 5 located at the opposite end being in transmission connection to the gearing arrangement 2. To ease the description, this example embodiment uses one transfer gear 5 and one self-locking gear 3 to explain the structure.

In one implementation, as illustrated in FIG. 11 and FIG. 12, the transfer gear 5 and the output gear 113 are coaxially disposed and interlocked. The transfer gear 5 and the output gear 113 are coaxially provided, whereby the size of the gearing arrangement 110 may be shrunk in the radial direction of the output gear 113. In addition, the transfer gear 5 does not mesh with the output gear 113, so that the modulus and tooth profile of the transfer gear 5 may be different from those of the output gear 113. Respective modulus and tooth profile of the transfer gear 5 and the self-locking gear 3 may be separately designed dependent on the magnitude of self-locking force, independent of the gearing 111, offering a more flexibility in adjusting the structure and self-locking force of the gearing arrangement 110 as well as a wider array of applications. The transfer gear 5 and the output gear 113 may be formed of an integral structure, which may increase the connecting strength therebetween and make the structure more compact. It may be understood that the interlocking between the transfer gear 5 and the output gear 113 may be also implemented by typical fixation manners such as soldering, threaded connection, key joint, and snap-fit. Without changing the gearing efficiency of the gearing arrangement, the transfer gear 5 and the self-locking gear may also be formed as a spur gear, a helical gear, a double helical gear, a conical gear, a bevel gear, and a worm gear, so as to be adapted to various reasonable self-locking mounting manners under different operating conditions and reasonable layout of a reduction gearbox space. Of course, it may be understood that the casing and the housing may also be detachably connected.

In another implementation, the transfer gear meshes with the output gear. This structure may shrink the size of the gearing arrangement 110 in the axial direction of the output gear 113, so that the gearing arrangement 110 is more flattened.

Figure 13:
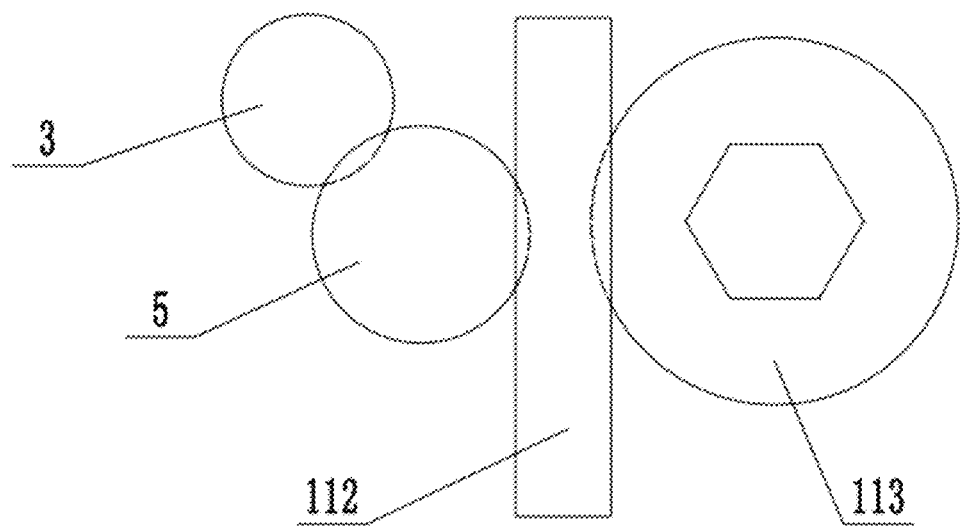
FIG. 13 is a third local structural schematic diagram of Example Embodiment 3.

In another implementation, as illustrated in FIG. 13, the transfer gear 5 and the input gear 112 are coaxially disposed and interlocked. The gearing 111 is a reduction mechanism configured to increase torque by speed reduction, the transfer gear 5 being directly in transmission connection with the input gear 112 so that the input gear 112 is directly self-locked. The self-locking toque may be amplified when being transferred to the output gear 113 via the gearing 111; as such, without changing the self-locking structure formed by the transfer gear 5, the self-locking gear 3, and the torsion spring, this configuration may increase the self-locking force of the self-locking structure with respect to the gearing arrangement 110, achieving a better self-locking effect.

The coaxial configuration of the transfer gear 5 and the input gear 112 may shrink the size of the gearing arrangement 110 in the radial direction of the output gear 113. In addition, the transfer gear 5 does not mesh with the input gear 112 so that the modulus and tooth profile of the transfer gear 5 may be different from those of the input gear 112. Respective modulus and tooth profile of the transfer gear 5 and the self-locking gear 3 may be separately designed dependent on the magnitude of the self-locking force, independent of the gearing 111, offering a more flexibility in adjusting the structure and self-locking force of the gearing arrangement 110 as well as a wider array of applications. The transfer gear 5 and the input gear 112 may be formed of an integral structure, which may increase the connecting strength therebetween and make the structure more compact. It may be understood that the interlocking between the transfer gear 5 and the input gear 112 may also be implemented by typical fixation manners such as soldering, threaded connection, key joint, and snap-fit.

In another implementation, as illustrated in FIG. 13, the transfer gear 5 meshes with the input gear 112. The structure may shrink the size of the gearing arrangement 110 in the axial direction of the input gear 112, making the gearing arrangement 110 more flattened.

Figure 14:
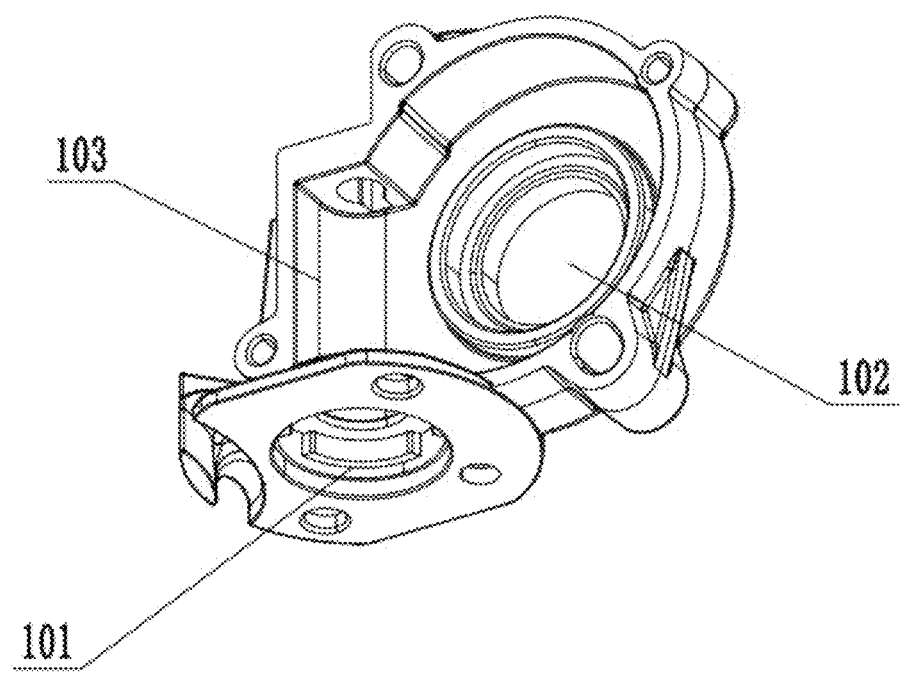
FIG. 14 is a structural schematic diagram of a lower casing in Example Embodiment 3.
Figure 15:
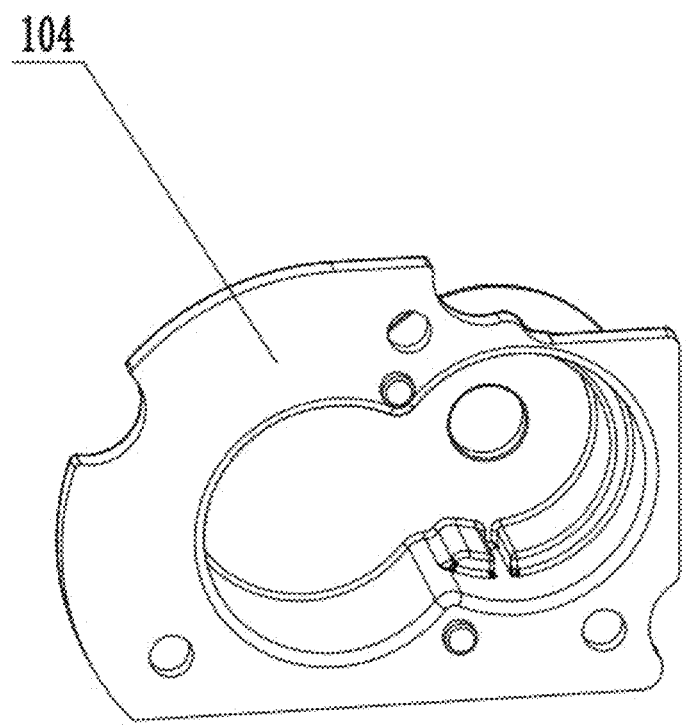
FIG. 15 is a structural schematic diagram of an upper cover in Example Embodiment 3.

In one implementation, as illustrated in FIG. 14 and FIG. 15, the casing 1 comprises a lower casing 1.3 and an upper cover 1.4 which are screw-fitted to realize detachable connection, the upper cover 1.4 being placed over the lower casing 1.3 to form a chamber accommodating the gearing 111, the transfer gear 5, and the self-locking gear 3; as illustrated in FIG. 1, FIG. 2, FIG. 14, and FIG. 15, the gearing 111 comprises a worm and a worm gear provided with an insertion opening 114, an input hole 101 for the worm to pass through and an output hole 102 corresponding to the insertion opening 114 being provided on the casing 1. This structure facilitates connection of the worm gear and the worm to the driving mechanism and the driven mechanism; meanwhile, the worm gear-worm transmission structure can change the transmission direction and save transmission space. The insertion opening 114 enables direct connection between the worm gear and an external structural element which needs power input. In a case where the gearing 111 is formed by the worm and the worm gear, the teeth on the worm gear are relatively thin with a low strength, so that the teeth on the worm gear need to be adapted to the worm, which cannot be changed arbitrarily; coaxial fixation between the transfer gear 5 and the worm gear may prevent the worm gear from meshing with the transfer gear 5, so that the self-locking force is be directly transferred to the worm gear, whereby the transfer gear 5 causes no damages to the teeth on the worm gear.

In one implementation, as illustrated in FIG. 11, the self-locking gear and the input gear at least partially overlap in the axial direction of the output gear. The projection of the self-locking gear in the axial direction of the output gear at least partially overlaps with the projection of the input gear in the radial direction of the output gear in a same projection plane.

It may be understood that in another implementation, as illustrated in FIG. 12, the self-locking gear and the input gear at least partially overlap in the radial direction of the output gear. The projection of the self-lock gear in the radial direction of the output gear at least partially overlaps with the projection of the input gear in the radial direction of the output gear in a same projection plane.

Example Embodiment 4

As illustrated in FIG. 9, an actuator 100 comprises an electric motor 120; the actuator 100 further comprises the gearing arrangement 110 as described in Example Embodiment 2 or Example Embodiment 3, an output end of the electric motor 120 being in transmission connection with the gearing 111. The input gear 112 of the gearing arrangement 110 is connected to an output shaft of the electric motor 120; the output gear 113 of the gearing arrangement 110 is connected to a drive shaft of the lifting column; the gearing arrangement 110 as an intermediary transmission element may increase and transfer the torque outputted by the electric motor 120; in addition, the gearing arrangement 110 is self-lockable, which enables self-locking of the actuator 100. When the actuator rotates forwardly, the actuator drives the lifting column 200 of the table to rise via the gearing arrangement 110; when the lifting column 200 of the table rises to a desired height, the output shaft of the actuator stops rotation; by blocking the output gear 113 from rotating reversely, the self-locking gear limits the lifting column 200, preventing falling of the lifting column 200 under gravity.

Example Embodiment 5

Figure 16:
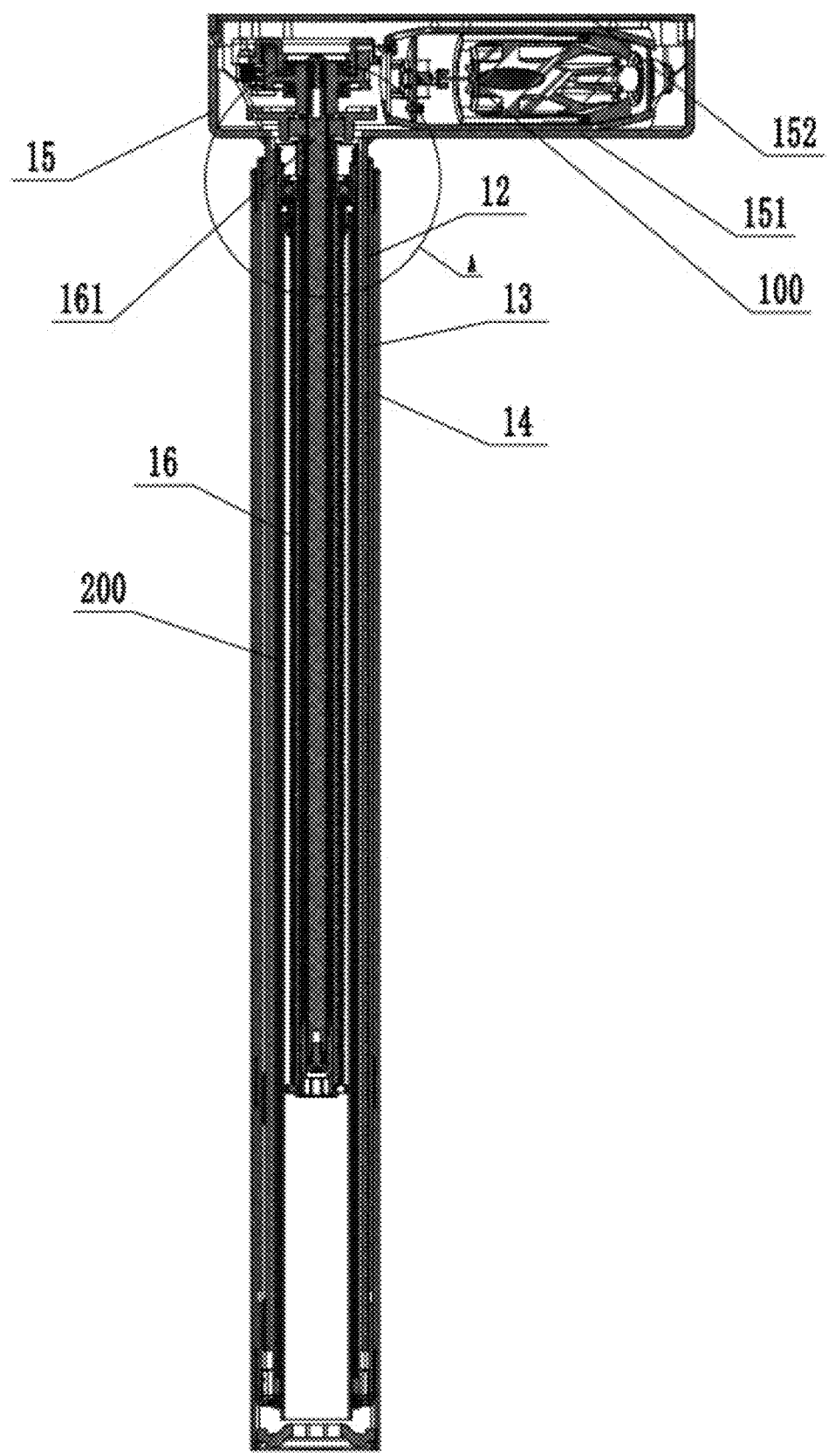
FIG. 16 is s structural schematic diagram of a lifting column in Example Embodiment 5.
Figure 17:
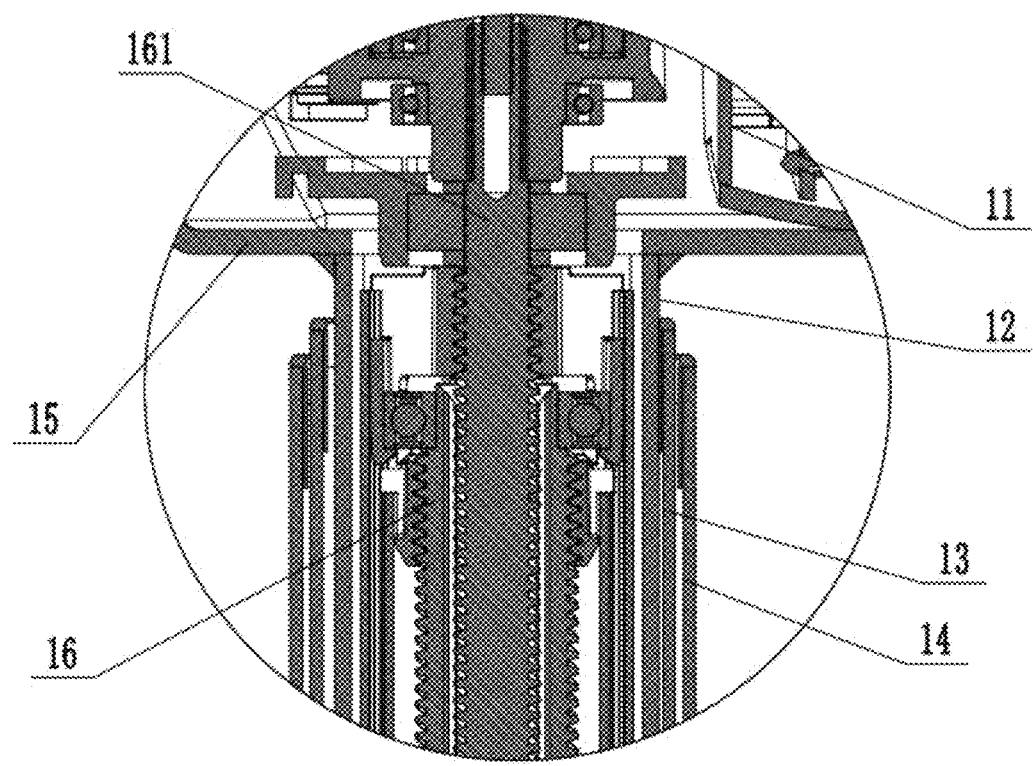
FIG. 17 is a local enlarged view of part A in FIG. 16.

As illustrated in FIG. 16 and FIG. 17, a lifting platform comprises a lifting column 200; the lifting platform further comprises the actuator 100 described supra; the lifting column 200 comprises an inner tube 12, a middle tube 13, an outer tube 14, a bottom casing 15 fixedly connected to an upper end of the inner tube 12, the actuator 100 disposed in the bottom casing 15, and a transmission assembly 16 in transmission-fit with the actuator 100, the inner tube 12, the middle tube 13, the outer tube 14, the bottom casing 15, the actuator 100, and the transmission assembly 16 being sequentially sleeved inside and out; the bottom casing 15 comprising a box body 151 and a box cover 152, the box cover 152 covering an opening of the box body 151 so that the bottom casing 15 has an accommodation space for accommodating the actuator 100, the output gear 113 of the actuator 100 being in transmission-fit with an upper end of a drive screw 161 in the transmission assembly 16. The specific structure of the transmission assembly 16 and alternative structures of the lifting column 200 may refer to the technical solutions disclosed in the patent literature CN106966345A.

We claim:

1. A self-locking mechanism for a gearing arrangement, comprising:
   a casing;
   a self-locking gear; and a brake member, the self-locking gear meshing with the gearing arrangement, the brake member being connected between the casing and the self-locking gear,
   wherein in a case where the gearing arrangement pushes the self-locking gear forwardly, the brake member releases the self-locking gear, and in a case where the gearing arrangement pushes the self-locking gear reversely, the brake member brakes the self-locking gear,
   wherein the self-locking gear comprises a meshing part and a rotary part which is coaxially arranged with and secured to the meshing part, the brake member being connected to the rotary part,
   wherein the brake member refers to a torsion spring sleeved over the rotary part, the torsion spring elastically pressing against the rotary part, one end of the torsion spring being connected to the casing, wherein in the case where the self-locking gear is forwardly pushed, the torsion spring is radially expanded to bring the self-locking gear to rotate, and in the case where the self-locking gear is reversely pushed, the torsion spring clasps the rotary part to brake the self-locking gear, and
   wherein the rotary part comprises a body portion integrally formed with the meshing part and a tubing sleeved over the body portion, the tubing being circumferentially secured with the body portion, the torsion spring being sleeved over the tubing.

2. The self-locking mechanism for the gearing arrangement according to claim 1, wherein the gearing arrangement includes an operating state and a self-locked state; wherein when the gearing arrangement is in the operating state, the gearing arrangement is driven to rotate to push the self-locking gear forwardly, whereby the torsion spring is radially expanded such that an inside diameter of the torsion spring is greater than an outer diameter of an end portion of the self-locking gear, further bringing the self-locking gear to rotate along with the gearing arrangement; and when external driving to the gearing arrangement is suspended while the gearing arrangement is subjected to an external force to rotate reversely, the gearing arrangement pushes the self-locking gear reversely, so that the torsion spring clasps the end portion of the self-locking gear to block the self-locking gear from rotating, whereby the gearing arrangement is braked.

3. The self-locking mechanism for the gearing arrangement according to claim 1, wherein the rotary part is coaxially provided at each of two ends of the meshing part, respectively; and two brake members are provided, the two brake members being connected to the two rotary parts, respectively.

4. The self-locking mechanism for the gearing arrangement according to claim 1, wherein a rotary shaft is provided in the casing, the self-locking gear being sleeved outside the rotary shaft and in rotational connection to the rotary shaft.

5. A gearing arrangement, comprising a housing and gearing disposed in the housing, wherein the gearing arrangement further comprises the self-locking mechanism according to claim 1, the self-locking gear being in transmission connection to the gearing.

6. The gearing arrangement according to claim 5, wherein the gearing comprises an input gear and an output gear, the self-locking gear meshing with the output gear or the input gear.

7. The gearing arrangement according to claim 5, wherein the gearing comprises an input gear, an output gear, and a transfer gear, the transfer gear being in transmission connection to the output gear or the input gear, the self-locking gear meshing with the transfer gear.

8. The gearing arrangement according to claim 7, wherein the transfer gear and the output gear are co-axially disposed and interlocked; or, the transfer gear meshes with the output gear; or, the transfer gear and the input gear are coaxially disposed and interlocked; or, the transfer gear meshes with the input gear.

9. The gearing arrangement according to claim 5, wherein the gearing comprises a worm, and a worm gear provided with an insertion opening, the housing being provided thereon with an input hole for the worm to pass through and an output hole corresponding to the insertion opening.

10. An actuator, comprising: an electric motor, wherein the actuator comprises the gearing arrangement according to claim 5, an output end of the electric motor being in transmission connection to the gearing.

11. A lifting platform, comprising a lifting column, wherein the lifting platform further comprises the actuator according to claim 10, the lifting column comprises a transmission assembly, the gearing being in transmission connection to the transmission assembly.

\* \* \* \* \*